(12) United States Patent
Elsom et al.

(10) Patent No.: US 12,004,532 B2
(45) Date of Patent: Jun. 11, 2024

(54) INVERTER MOTOR DRIVE FOR FROZEN CONFECTION MACHINE AND PROCESS FOR CONTROLLING A FROZEN CONFECTION MACHINE

(71) Applicant: H.C. Duke & Son, LLC, East Moline, IL (US)

(72) Inventors: Kyle B. Elsom, Le Claire, IA (US); Dustin Meyermann, East Moline, IL (US); Joshua Otto, Bettendorf, IA (US)

(73) Assignee: H.C. Duke & Son, LLC, East Moline, IL (US)

( * ) Notice: Subject to any disclaimer, the term of this patent is extended or adjusted under 35 U.S.C. 154(b) by 1060 days.

(21) Appl. No.: 16/876,803

(22) Filed: May 18, 2020

(65) Prior Publication Data

US 2020/0359648 A1 Nov. 19, 2020

Related U.S. Application Data

(60) Provisional application No. 62/849,396, filed on May 17, 2019.

(51) Int. Cl.
| | |
|---|---|
| *A23G 9/12* | (2006.01) |
| *A23G 9/22* | (2006.01) |
| *A23G 9/28* | (2006.01) |
| *B01F 35/212* | (2022.01) |
| *B01F 35/213* | (2022.01) |
| *B01F 35/221* | (2022.01) |
| *B01F 35/222* | (2022.01) |
| *B01F 35/90* | (2022.01) |
| *B01F 101/13* | (2022.01) |

(52) U.S. Cl.
CPC ............. *A23G 9/12* (2013.01); *A23G 9/22* (2013.01); *A23G 9/28* (2013.01); *B01F 35/212* (2022.01); *B01F 35/213* (2022.01); *B01F 35/22142* (2022.01); *B01F 35/2215* (2022.01); *B01F 35/222* (2022.01); *B01F 35/90* (2022.01); *B01F 2035/98* (2022.01); *B01F 2101/13* (2022.01)

(58) Field of Classification Search
CPC .... A23G 9/12; A23G 9/22; A23G 9/28; B01F 35/2215; B01F 35/222; B01F 35/212; B01F 35/90; B01F 35/22142; B01F 35/213; B01F 2035/98; B01F 2101/13
USPC .......................................................... 99/455
See application file for complete search history.

(56) References Cited

U.S. PATENT DOCUMENTS

| | | | | |
|---|---|---|---|---|
| 4,747,272 A | * | 5/1988 | Howell | A23G 9/228 137/101.21 |
| 11,758,920 B1 | * | 9/2023 | Frank | A23G 9/281 62/303 |
| 2005/0081554 A1 | * | 4/2005 | Ross | A23G 9/281 62/342 |
| 2009/0133429 A1 | * | 5/2009 | Petersen | A23G 9/222 62/342 |

(Continued)

*Primary Examiner* — Omar Flores Sanchez
(74) *Attorney, Agent, or Firm* — Dinsmore & Shohl LLP

(57) ABSTRACT

A frozen confection dispensing apparatus includes a refrigeration system. A variable frequency drive is connected to the refrigeration system. A beater motor is connected to the variable frequency drive. The variable frequency drive calculates the beater motor torque and regulates the refrigeration system activation. The variable frequency drive varies a speed and/or torque of the beater motor regulating a size of ice crystals and overrun of a frozen confection product.

20 Claims, 1 Drawing Sheet

(56) References Cited

U.S. PATENT DOCUMENTS

| | | | |
|---|---|---|---|
| 2009/0211269 A1* | 8/2009 | Gist | F25C 1/145 |
| | | | 62/135 |
| 2014/0311416 A1* | 10/2014 | Stiles, Jr. | B01F 35/82 |
| | | | 119/263 |
| 2016/0047184 A1* | 2/2016 | Luharuka | B01F 35/2136 |
| | | | 166/250.01 |
| 2023/0025966 A1* | 1/2023 | Macaluso | B01F 31/445 |
| 2023/0054112 A1* | 2/2023 | Rollins | B01F 35/21 |
| 2023/0234011 A1* | 7/2023 | Lazzarini | B01F 35/95 |
| | | | 426/519 |

* cited by examiner

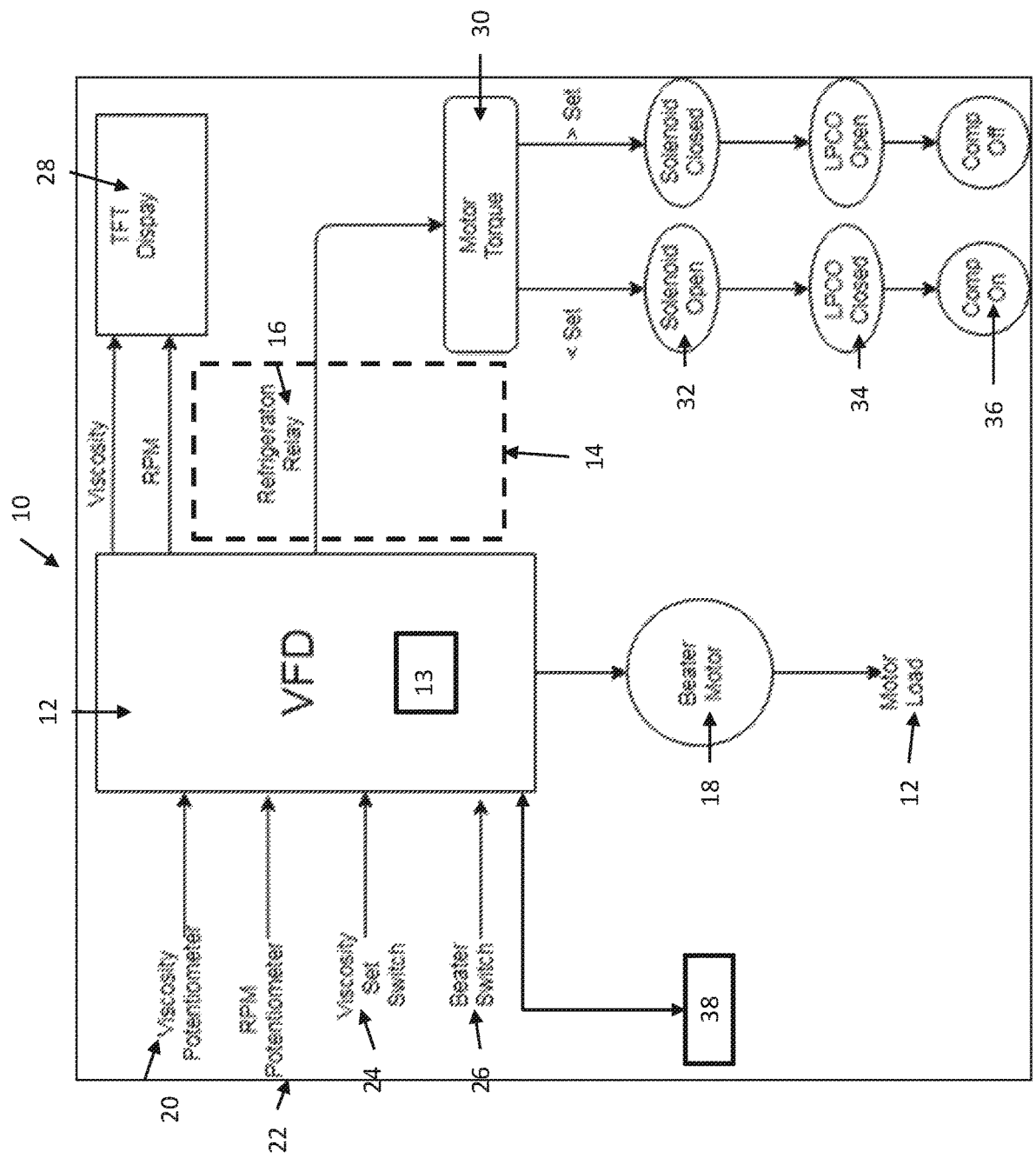

INVERTER MOTOR DRIVE FOR FROZEN CONFECTION MACHINE AND PROCESS FOR CONTROLLING A FROZEN CONFECTION MACHINE

CROSS-REFERENCE TO RELATED APPLICATIONS

This application claims priority of U.S. Provisional Application No. 62/849,396 filed May 17, 2019 the contents of which are incorporated herein by reference.

FIELD OF THE INVENTION

The invention relates to a frozen confection dispensing apparatus and with more particularity to a frozen confection dispensing apparatus including a variable frequency drive

BACKGROUND OF THE INVENTION

Generally, there have been efforts regulate the product consistency of a frozen confection machine. The consistency is regulated by controlling the percentage of the mixture that is frozen, and by regulating the ice crystal size. As the product consistency varies, different textures and mouth feel of the product are achieved. This ranges from a smooth and creamy product, to a course and grainy product, depending on the desired attributes and the type of product being frozen. The products ability to incorporate air to achieve varying levels of overrun (% expansion from the liquid state to the frozen state) is also affected by the products consistency. The key attributes that affect the consistency of a mix are the ice crystal size and the percentage of the mix that is allowed to freeze (ice fraction). The ice fraction of the mix can be measured by monitoring the power supplied to the mix drive motor. As a greater portion of the mix is frozen, the load on the mix motor increases. This in turn requires an increase in the supply current to the motor to increase the output torque. The capacity of the refrigeration system is then regulated by cycling the refrigeration compressor based on the measured motor current value.

Ice crystal size is regulated by the rate at which the ice is generated vs. the speed that it is harvested. The ice is harvested by rotating a scrapper blade around the cylinder wall. These are typically driven at a fixed speed. Typically, ice crystal size is controlled by matching blade designs at a fixed rotational speed to the rate at which the ice is generated. Such as system may be difficult to control to provide a specified ice crystal size. Typically, problems can arise with conventional monitoring technologies due to supply voltage variations. Nominal supply voltages range from 208 V+/−10% to 230 V+/−10%. Motors are typically optimized at a specific voltage.

There is therefore a need in the art for an improved system and method of controlling ice crystal size and overrun in a frozen confection machine.

SUMMARY OF THE INVENTION

In one aspect, there is disclosed a frozen confection dispensing apparatus that includes a refrigeration system. A variable frequency drive is connected to the refrigeration system. A beater motor is connected to the variable frequency drive. The variable frequency drive calculates the beater motor torque and regulates the refrigeration system activation. The variable frequency drive varies a speed of the beater motor regulating a size of ice crystals of a frozen confection product.

In another aspect, there is disclosed there is disclosed a frozen confection dispensing apparatus that includes a refrigeration system. A variable frequency drive is connected to the refrigeration system. A beater motor is connected to the variable frequency drive. The variable frequency drive calculates the beater motor torque and regulates the refrigeration system activation. The variable frequency drive varies a torque of the beater motor regulating a size of ice crystals and overrun of a frozen confection product.

BRIEF DESCRIPTION OF THE DRAWINGS

FIG. 1 is a schematic drawing of frozen confection machine.

DETAILED DESCRIPTION OF THE PREFERRED EMBODIMENTS

A frozen confection machine 10 generally includes a

Referring to FIG. 1, there is shown a portion of a frozen confection machine 10. The frozen confection machine 10 includes a variable frequency drive (VFD) 12 coupled to a refrigeration system 14. The refrigeration system is structured to freeze a frozen confection base product. Such refrigeration systems are generally known in the art. The refrigeration system 14 includes a refrigeration relay 16 that may be utilized to start and stop the refrigeration cycle The VFD 12 is also coupled to a beater motor 18. The beater motor 18 mixes a product mixture within the refrigeration section and may be either an AC or DC motor. The product mixture may be frozen such that it has a desired consistency and ice crystal size for a specified product.

The VFD receives several inputs including data from a viscosity potentiometer 20, data from a RPM potentiometer 22, data from a viscosity set switch 24 and data from a beater motor switch 26. The viscosity and RPM data may be indicated on a display 28 coupled with the VFD 12.

In one aspect, the VFD 12 includes a frequency inverter 13 to regulate the speed and monitor the power supplied to the beater motor 18. The frequency inverter 13 varies the incoming power supply to the beater motor 18 to allow the speed to be regulated by varying the supply frequency and voltage. In addition, the frequency inverter 13 may measure the power supplied to the beater motor 18.

The VFD 12 has the ability to regulate the power and speed of the beater motor 18 such that the torque to current relationship is kept nearly constant. As the voltage dips below its nominal values, speed is decreased such that the peak current and therefore peak torque are maintained. If the voltage supply is above the nominal value for the motor, the frequency inverter 13 will regulate the supplied voltage such that the nominal value is maintained. This keeps the peak current at a constant value, and prevents the motor from become saturated. At saturation, increases in motor current do not provide any additional increase in torque. By maintaining the current to torque relationship throughout the rated voltage range, the measured torque of the beater motor 18 and the associated consistency of the frozen mixture are kept constant.

This is in contrast to traditional power monitoring devices. As voltage varies, the relationship between measured current and output torque also begins to vary. In some cases, as the voltage is increased, the load current to the motor raises dramatically. This affects the ability of the controller to recognize when to turn the refrigeration system on in response to load. This can result in variations in product constancy. The result is a very narrow voltage operating range. Onsite voltage conditioning such as buck boost transformers are employed in some cases to compensate for local voltage variations. However, these are proportional devices, as the incoming voltage varies, so does the supply voltage to the machine. Fluctuations during the day will cause product consistency to vary using these conventional systems.

With the speed (RPM) known, the frequency inverter 13 can calculate the torque supplied to the beater motor to harvest the ice and to agitate the product mixture in a controlled manner. The ability to vary speed (RPM) and precisely measure motor torque 30 allows the ice crystal size to be controlled. As shown in FIG. 1, if the motor torque is less than a set value, the solenoid 32 is open, the low pressure cut out (LPCO) is closed and the compensation setting is ON. Further, if the motor torque is greater than a set value, the solenoid 32 is closed, the low pressure cut out (LPCO) is open and the compensation setting is OFF.

In one aspect, product attributes such as the consistency and ice crystal size will vary based on the product. Water ice, sorbet, ice cream, and gelatos all have unique product attributes. By varying the speed and regulating the refrigeration system 14 based on motor torques 30, the consistency can be controlled to achieve the desired product attributes depending on the product type.

To achieve thicker crystals, the harvest speed can be slowed at a given ice generation rate. Thinner crystals can be generated by increasing the speed at a given ice harvest rate. The allowable torque can be increased or decreased via the current settings to compensate for the variation in ice harvest rates, as well as the applied refrigeration capacity.

The VFD 12 may control the consistency of a frozen confection machine by regulating and measuring the torque. The torque may be measured by sending a scaled value of the torque current to a controller 38, which will activate and deactivate the refrigeration system 14 based on this value. Additionally, the VFD 12 may vary the speed of a frozen confection machine while at the same time varying the allowable torque to regulate the size of the ice crystals developed. The VFD 12 may further be used by setting the regulated speed at the minimum supplied voltage. This insures that the base speed will not need to be compensated to maintain the peak torque requirements. The base speed or base torque settings may be adjusted by an input to the VFD 12. In one aspect, the controller 38 may automatically adjust the allowable torque and the cut in and cut out differential of the refrigeration system 14 as the speed is varied to maintain a consistent ice crystal size.

In one aspect, there are different types of frozen confection machines. The two basic types are 1) demand based machines, where product is frozen and maintained in a barrel at the desired temperature and consistency, and product is dispensed on demand, and 2) batch type machines, where the product is frozen and then dispensed as a single batch. In some cases, batch machines will hold the product for a short duration prior to dispensing the product.

The ability to regulate and control ice crystal size and consistency has advantages for both of these equipment types. In the batch machine application, the amount of air incorporated into the mix, producing overrun (% expansion of the product from a liquid state), is affected by the percentage of frozen product and rotational speed of the beater motor 18. By varying the speed or RPM at critical points in the product freezing cycle, overrun can be more precisely controlled. In a liquid state, very little air is incorporated into the mix. As the product begins to freeze, air can become incorporated, so varying rotational speeds at this critical state are advantageous to regulate overrun. As the product reaches its desired ice fraction, typically 35-50% frozen, higher rotational speeds will begin to expel the air from the mixture. At this point in the cycle, lower rotational speeds are desired. By varying rotational speeds based on the frozen percentage of a product, overrun can be precisely regulated for a batch type freezer.

For a batch type frozen confection machine, the controller 38 and VFD 12 monitors the motor torque regulating the refrigeration system activation, and varies the speed of the beater motor 18. In one aspect, the beater motor RPM may be varied based on the measured torque at interim steps throughout the freeze cycle to optimize the level of overrun of the finished product. The controller 38 and VFD 12 may vary beater motor speed and torque to maintain the product at serving conditions for a limited time until the product is dispensed.

EXAMPLES

A batch frozen confection machine including a VFD with a three HP Inverter Duty Motor, and a 2.5 HP refrigeration system, was utilized. The system included input to the VFD provided by potentiometers for speed and viscosity settings. The VFD was programmed to accept this input, and adjust RPM, Viscosity, and Viscosity Hysteresis based on these inputs, and providing an analog signal back to a display to display the values of Speed and Viscosity.

Various torque and speed parameters were varied in the system as presented in Table 1 below for different products.

TABLE 1

Product Consistency

| Product | Hysteresis | Speed | Overrun | Crystal | Torque (lbf·in) | Temp |
|---------|------------|-------|---------|---------|-----------------|------|
| Water Ice | 25% | 200 | 0 | Grainy | 10-30 | 23-28 |
| Sorbet | 35% | 230 | 40% | Smooth | 40-50 | 18-20 |
| Ice Cream | 50% | 180 | 80-100% | Smooth | 50-60 | 22-24 |
| Gelato | 50% | 130 | 30-40% | Smooth | 80-95 | 18-19 |

As can be seen in the table, the system as described above may be utilized to produce a consistent water ice product. The product included a grainy crystal with zero overrun. The product was produced by maintaining a speed of 200 rpm on the beater motor with regulating the torque from 10-30 lbf·in and regulating the temperature from 23-28 Fahrenheit.

As can be seen in the table, the system as described above may be utilized to produce a consistent sorbet product. The product included a smooth crystal with 40% overrun. The product was produced by maintaining a speed of 230 rpm on the beater motor with regulating the torque from 40-50 lbf·in and regulating the temperature from 18-20 Fahrenheit.

As can be seen in the table, the system as described above may be utilized to produce a consistent ice cream product. The product included a smooth crystal with 80-100% overrun. The product was produced by maintaining a speed of 180 rpm on the beater motor with regulating the torque from 50-60 lbf·in and regulating the temperature from 22-24 Fahrenheit.

As can be seen in the table, the system as described above may be utilized to produce a consistent gelato product. The product included a smooth crystal with 30-40% overrun. The product was produced by maintaining a speed of 130 rpm on the beater motor with regulating the torque from 80-95 lbf·in and regulating the temperature from 18-19 Fahrenheit.

The invention claimed is:

1. A frozen confection machine comprising:
    a refrigeration system;
    a variable frequency drive connected to the refrigeration system;
    a beater motor connected to the variable frequency drive;
    wherein the variable frequency drive calculates the beater motor torque and regulates the refrigeration system activation and wherein the variable frequency drive varies a speed of the beater motor regulating a size of ice crystals of a frozen confection product.

2. The frozen confection machine of claim 1, wherein the variable frequency drive varies a torque of the beater motor regulating the size of ice crystals of the frozen confection product.

3. The frozen confection machine of claim 1 wherein the variable frequency drive includes a frequency inverter that varies an incoming power supply to the beater motor controlling the speed of the beater motor.

4. The frozen confection machine of claim 1 wherein the frequency inverter regulates the power to maintain a current to torque relationship of the beater motor over a voltage range wherein the measured torque of the beater motor is kept constant.

5. The frozen confection machine of claim 1 including a controller connected to the variable frequency drive, the controller activating and deactivating the refrigeration system.

6. The frozen confection machine of claim 1 wherein the variable frequency drive sets the regulated speed at a minimum supplied voltage.

7. The frozen confection machine of claim 1 wherein a frozen confection product is a water ice and the speed is set at 200 rpm and the torque is varied from 10 to 30 lbf·in at a temperature of from 23-28 Fahrenheit producing a product with a grainy crystal and zero percent overrun.

8. The frozen confection machine of claim 1 wherein a frozen confection product is a sorbet and the speed is set at 230 rpm and the torque is varied from 40 to 50 lbf·in at a temperature of from 18-20 Fahrenheit producing a product with a smooth crystal and forty percent overrun.

9. The frozen confection machine of claim 1 wherein a frozen confection product is a ice cream and the speed is set at 180 rpm and the torque is varied from 50 to 60 lbf·in at a temperature of from 22-24 Fahrenheit producing a product with a smooth crystal and eighty to one hundred percent overrun.

10. The frozen confection machine of claim 1 wherein a frozen confection product is a gelato and the speed is set at 130 rpm and the torque is varied from 80 to 95 lbf·in at a temperature of from 18-19 Fahrenheit producing a product with a smooth crystal and thirty to forty percent overrun.

11. A frozen confection machine comprising:
    a refrigeration system;
    a variable frequency drive connected to the refrigeration system;
    a beater motor connected to the variable frequency drive;
    wherein the variable frequency drive calculates the beater motor torque and regulates the refrigeration system activation and wherein the variable frequency drive varies a torque of the beater motor regulating an overrun of a frozen confection product.

12. The frozen confection machine of claim 1 wherein the variable frequency drive varies a speed of the beater motor regulating a size of ice crystals of a frozen confection product.

13. The frozen confection machine of claim 11 wherein the variable frequency drive includes a frequency inverter that varies an incoming power supply to the beater motor controlling the speed of the beater motor.

14. The frozen confection machine of claim 11 wherein the frequency inverter regulates the power to maintain a current to torque relationship of the beater motor over a voltage range wherein the measured torque of the beater motor is kept constant.

15. The frozen confection machine of claim 11 including a controller connected to the variable frequency drive, the controller activating and deactivating the refrigeration system.

16. The frozen confection machine of claim 11 wherein the variable frequency drive sets the regulated speed at a minimum supplied voltage.

17. The frozen confection machine of claim 11 wherein a frozen confection product is a water ice and the speed is set at 200 rpm and the torque is varied from 10 to 30 lbf·in at a temperature of from 23-28 Fahrenheit producing a product with a grainy crystal and zero percent overrun.

18. The frozen confection machine of claim 11 wherein a frozen confection product is a sorbet and the speed is set at 230 rpm and the torque is varied from 40 to 50 lbf·in at a temperature of from 18-20 Fahrenheit producing a product with a smooth crystal and forty percent overrun.

19. The frozen confection machine of claim 11 wherein a frozen confection product is a ice cream and the speed is set at 180 rpm and the torque is varied from 50 to 60 lbf·in at a temperature of from 22-24 Fahrenheit producing a product with a smooth crystal and eighty to one hundred percent overrun.

20. The frozen confection machine of claim 11 wherein a frozen confection product is a gelato and the speed is set at 130 rpm and the torque is varied from 80 to 95 lbf·in at a temperature of from 18-19 Fahrenheit producing a product with a smooth crystal and thirty to forty percent overrun.

* * * * *